US012401750B1

(12) United States Patent
Frisch

(10) Patent No.: US 12,401,750 B1
(45) Date of Patent: Aug. 26, 2025

(54) DEVICES, SYSTEMS, AND METHODS OF CONDUCTING EMERGENCY CALLS USING A DONATION KIOSK

(71) Applicant: Payroc BQ, LLC, Tinley Park, IL (US)

(72) Inventor: Kevin Frisch, Tinley Park, IL (US)

(73) Assignee: Payroc BQ, LLC, Tinley Park, IL (US)

( * ) Notice: Subject to any disclaimer, the term of this patent is extended or adjusted under 35 U.S.C. 154(b) by 0 days.

(21) Appl. No.: 19/041,140

(22) Filed: Jan. 30, 2025

Related U.S. Application Data

(60) Provisional application No. 63/714,280, filed on Oct. 31, 2024.

(51) Int. Cl.
| | |
|---|---|
| *H04M 11/04* | (2006.01) |
| *G06F 3/0482* | (2013.01) |
| *G06F 3/04886* | (2022.01) |
| *G06Q 10/1093* | (2023.01) |
| *G06Q 20/18* | (2012.01) |
| *G06Q 20/32* | (2012.01) |

(52) U.S. Cl.
CPC ......... *H04M 11/04* (2013.01); *G06F 3/04886* (2013.01); *G06Q 10/1093* (2013.01); *G06Q 20/18* (2013.01); *G06Q 20/3278* (2013.01); *G06F 3/0482* (2013.01); *H04M 2242/04* (2013.01)

(58) Field of Classification Search
CPC ........................ G06F 3/04886; G06Q 10/1093; G06Q 20/18; G06Q 20/3278; H04M 11/04

USPC ............................................................ 379/37
See application file for complete search history.

(56) References Cited

U.S. PATENT DOCUMENTS

| | | | |
|---|---|---|---|
| 11,089,466 B2 | 8/2021 | Katz | |
| 11,109,191 B2 | 8/2021 | Qi | |
| 11,928,951 B2 | 3/2024 | Katz | |
| 2012/0232980 A1* | 9/2012 | Wald | G06Q 30/0233 |
| | | | 705/14.27 |
| 2015/0294431 A1* | 10/2015 | Fiorucci | G07B 15/02 |
| | | | 705/13 |

* cited by examiner

*Primary Examiner* — Maria El-Zoobi
(74) *Attorney, Agent, or Firm* — TROUTMAN PEPPER LOCKE LLP; Korbin M. Blunck

(57) ABSTRACT

The disclosed technology includes a donation kiosk comprising a microphone; a speaker; an input device configured to receive donation information; a user interface; one or more processors; and a memory storing instructions. The instructions, when executed by the one or more processors, are configured to cause the donation kiosk to determine whether to operate in an emergency mode. In response to determining that the donation kiosk should operate in the emergency mode, the instructions can cause the donation kiosk to display an emergency call option on the user interface. In response to the emergency call option being selected, the instructions can further cause the donation kiosk to facilitate communication with an emergency service via the microphone and speaker.

20 Claims, 9 Drawing Sheets

DEVICES, SYSTEMS, AND METHODS OF CONDUCTING EMERGENCY CALLS USING A DONATION KIOSK

CROSS-REFERENCE TO RELATED APPLICATIONS

This application claims the benefit, under 35 U.S.C. § 119(e), of U.S. Provisional Patent Application No. 63/714,280, filed 31 Oct. 2024, the entire contents and substance of which are incorporated herein by reference in their entirety as if fully set forth below.

FIELD OF TECHNOLOGY

The present disclosure relates generally to devices, systems, and method of conducting an emergency call using a donation kiosk.

BACKGROUND

It is common for some places of worship, government buildings, and other private or protected spaces to restrict or otherwise discourage patrons from bringing their mobile phones into the space. For example, On Shabbos and Yom Tov, Jewish law forbids the standard use of certain technologies and/or carrying of items such as cell phones. Such practices can help patrons focus during worship services or other events.

Unfortunately, in today's world, violent events such as mass shootings or stabbings or other emergency events are not uncommon. Accordingly, in spaces where patrons are discouraged from bringing their mobile phones into the space, a situation could arise where a violent event occurs but no one within the space is able to make an emergency call. Accordingly, there is a need for devices, systems, and methods of conducting emergency calls during an emergency within spaces where patrons are discouraged from bringing mobile phones into the space. These and other problems are addressed by the technology disclosed herein.

SUMMARY

The present disclosure provides an emergency calling system built into a donation kiosk or other commonly used kiosk that does not normally contain emergency calling features.

The present disclosure provides a donation kiosk having a microphone, a speaker, an input device configured to receive donation information, and a user interface. The kiosk can also include one or more processors and a memory storing thereon instructions for operation of the kiosk. The instructions, when executed by the one or more processors, can cause the donation kiosk to determine whether to operate in an emergency mode. In response to determining that the donation kiosk should operate in the emergency mode, the instructions can cause the kiosk to display an emergency call option on the user interface. In response to the emergency call option being selected, the instructions cause the kiosk to facilitate communication with an emergency service via the microphone and speaker.

In any of the embodiments disclosed herein, determining whether to operate in an emergency mode can include comparing date information to a schedule of religious events on which use of certain technology is prohibited and determining that a current date overlaps with a religious event on which use of certain technology is prohibited. In any of the embodiments disclosed herein, comparing the date information can occur at pre-determined intervals.

In any of the embodiments disclosed herein the user interface can include a touchscreen, and the emergency call option can include a slide button. Upon sliding of the slide button, the user interface can provide an option to terminate the emergency call. In any of the embodiments disclosed herein, the emergency call option can include a press-and-hold button and, upon holding of the press-and-hold button, the user interface can display an option to terminate the emergency call placed by pressing and holding the press and hold button.

In any of the embodiments disclosed herein, upon the donation kiosk receiving an incoming call, the donation kiosk can display an option to accept the incoming call.

In any of the embodiments disclosed herein, the user interface can further display an option for making a donation, an option for viewing a religious schedule, an option for viewing seating availability, and/or an option for viewing a schedule of events.

In any of the embodiments disclosed herein, the input device can further include a magnetic stripe reader, a chip card reader, and/or an NFC card reader for receiving the donation information.

In any of the embodiments disclosed herein, the donation kiosk can further include a unique web-based voice-over-internet-protocol telephone number. The emergency call option can include two or more options: one for a nonreligious emergency services provider option and one for a religious emergency services provider option. One or both of the nonreligious emergency services provider and the religious services provider can have been previously notified that a location of the donation kiosk corresponds to the unique web-based voice-over-internet-protocol telephone number.

In any of the embodiments disclosed herein, the input device can include a touchscreen.

Another embodiment of the present disclosure provides a method of conducting an emergency call using a donation kiosk. The method can include determining that the donation kiosk should operate in an emergency mode, in response to determining that the donation kiosk should operate in the emergency mode, displaying an emergency call option, and in response to the emergency call option being selected, facilitating communication with an emergency service via a microphone and a speaker.

In any of the embodiments disclosed herein, the method step of determining that the donation kiosk should enter an emergency mode can include comparing, at pre-determined intervals, date information to a schedule of religious event on which use of certain technology is prohibited and determining that a current date overlaps with a religious event on which use of certain technology is prohibited.

In any of the embodiments disclosed herein, the method can further include providing the user an option to terminate a call following the user placing the call and entering the emergency mode when the user terminates the call.

In any of the embodiments disclosed herein, the method can further include entering a normal mode upon determining at a subsequent interval, that a current date does not overlap with a religious event on which use of certain technology is prohibited. The method can include, in the normal mode, displaying an option for making a donation, an option for viewing a religious schedule, an option for viewing seating availability, and/or an option for viewing a schedule of events.

Another embodiment of the present disclosure provides an emergency calling system for a donation kiosk. The emergency calling system can include a microphone, a speaker, a user interface, an input device configured to receive donation information, and one or more processors, and a memory storing instructions thereon that are executable by the processor. The instructions, when executed by the one or more processors, can be configured to cause the donation kiosk to display one or more of an option for making a donation via the input device, an option for viewing a religious schedule, an option for viewing seating availability, and an option for viewing a schedule of events. The instructions, when executed by the one or more processors, can be further configured to cause the donation kiosk to determine whether a current date corresponds to a religious event on which use of certain technology is prohibited and, in response to determining that the current date corresponds to the religious event on which use of certain technology is prohibited, determine that the donation kiosk should operate in an emergency mode and display an emergency call option. Further, the instructions, when executed by the one or more processors, can be further configured to cause the donation kiosk to, in response to the emergency call option being selected, facilitate communication with an emergency service via the microphone and speaker.

In any of the embodiments disclosed herein, the input device can include a touch screen and one or more of a magnetic stripe reader, a chip card reader, and an NFC card reader.

For example, the present disclosure provides an emergency calling system building into a shul management kiosk that features two dedicated buttons for emergency personnel (e.g., 911 and Hatzolah services). These emergency calling features are active during Shabbos and Yom Tov, when Jewish law generally prohibits the use of cell phones. When an emergency button is pressed, a modal window with a 'slide-to-call' interface appears, minimizing accidental calls.

The disclosed technology uses a web-based VoIP client to place emergency calls, utilizing the kiosk's microphone and speaker for real-time two-way communication. Each shul station is assigned a unique phone number, which may be pre-registered with local dispatch centers, so that emergency responders can instantly recognize the shul's location. Calls automatically end when the dispatcher hangs up, and emergency services can call back the kiosk if needed.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1A:
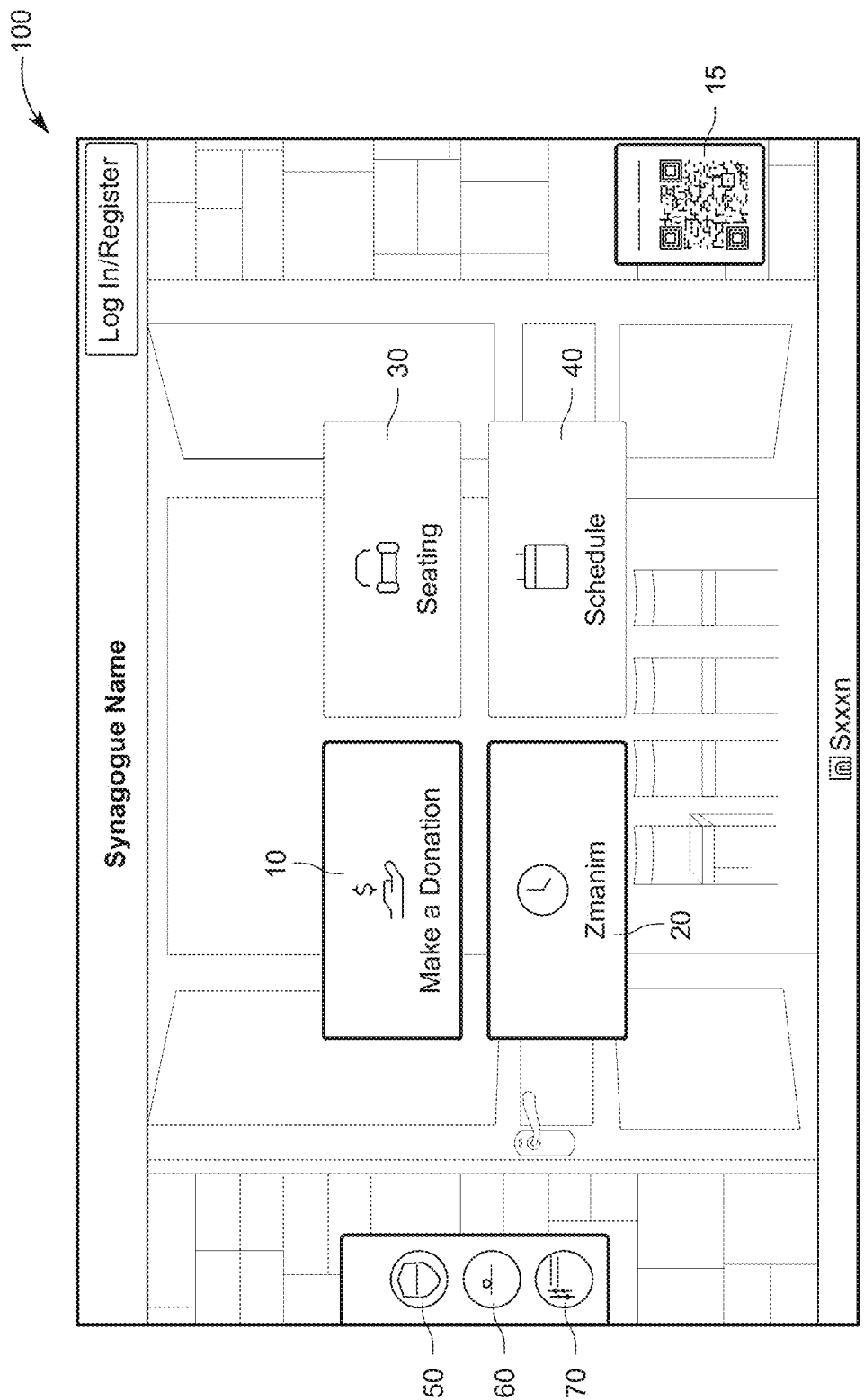
FIG. 1A illustrates a view of a home screen of a user interface of the kiosk while in standby mode, in accordance with the disclosed technology.

The present disclosure relates generally to devices, systems, and method of conducting emergency calls using a donation kiosk. Unlike existing donation kiosks, the disclosed technology includes features to enable a user to conduct an emergency call directly through the kiosk. This can be particularly helpful in places where patrons are prohibited or discouraged from bringing their mobile phone into a particular space. In this way, patrons in the space are able to summon emergency help when they would otherwise be unable to do so. The disclosed technology enables a patron to contact emergency services (police, medical personnel, fire personnel, etc.) directly through the donation kiosk to summon help. Donation kiosks are commonly employed in houses of worship, and for this reason it is particularly important that the donation kiosks be compatible with relevant religious practices. This emergency calling donation kiosk serves to facilitate donations and viewing relevant information in an easily accessible format while optionally being able to disable certain of these features in order to comply with religious practices while still providing the ability to make emergency calls.

As used here, the term "patron" can mean any person who is present in the space, whether they are employed, volunteering, or simply attending services or activities in the space. A patron can be a "user" of the donation kiosks, devices, and systems disclosed herein. Additionally, "payment kiosk" and "donation kiosk" are used interchangeably herein. As used here, "input device" means the one or more pieces of hardware that provide data and control signals to any of the donation kiosks, devices, and systems disclosed herein. Additionally, "user interface" as used herein means the graphical layout and options presented to and selectable a user of any of the donation kiosks, devices, and systems disclosed herein on an input device, such as a touchscreen.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being a donation kiosk for conducting emergency calls in places where mobile phones are prohibited or discouraged. The present disclosure, however, is not so limited, and can be applicable in other contexts. The present disclosure, for example and not limitation, can include kiosks used for purposes other than donations (e.g., schedule kiosks, informational kiosks). Such implementations and applications are contemplated within the scope of the present disclosure. Accordingly, when the present disclosure is described in the context of being a donation kiosk, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described.

FIG. 1A illustrates a view of a home screen of a user interface of the kiosk 100 while in a normal mode, also referred to as a "standby mode", in accordance with the disclosed technology. While in standby mode, the kiosk 100 can display several options that a patron can select, such as an option for making a donation 10, an option for viewing a religious schedule 20 (e.g., the Zmanim), an option for viewing seating 30, or an option for viewing a schedule 40 of events. A user may select any of these options to view additional information or take related actions. The kiosk 100 can also include a QR code 15 that patrons can scan with their mobile device if they would prefer to donate via their own mobile device and it is during a time when mobile phones are permitted in the space.

The kiosk 100 can also display options for selecting options for viewing opportunities to offer service or donate to charity (the "pushka station") such as donations to a volunteer organization such as Hatzolah 50, Bikur Cholim 60 or Tomchei Shabos 70. As will be appreciated, the home screen in standby mode can be adapted for a particular application and can display various options depending on the need of those using the kiosk 100.

Figure 1B:
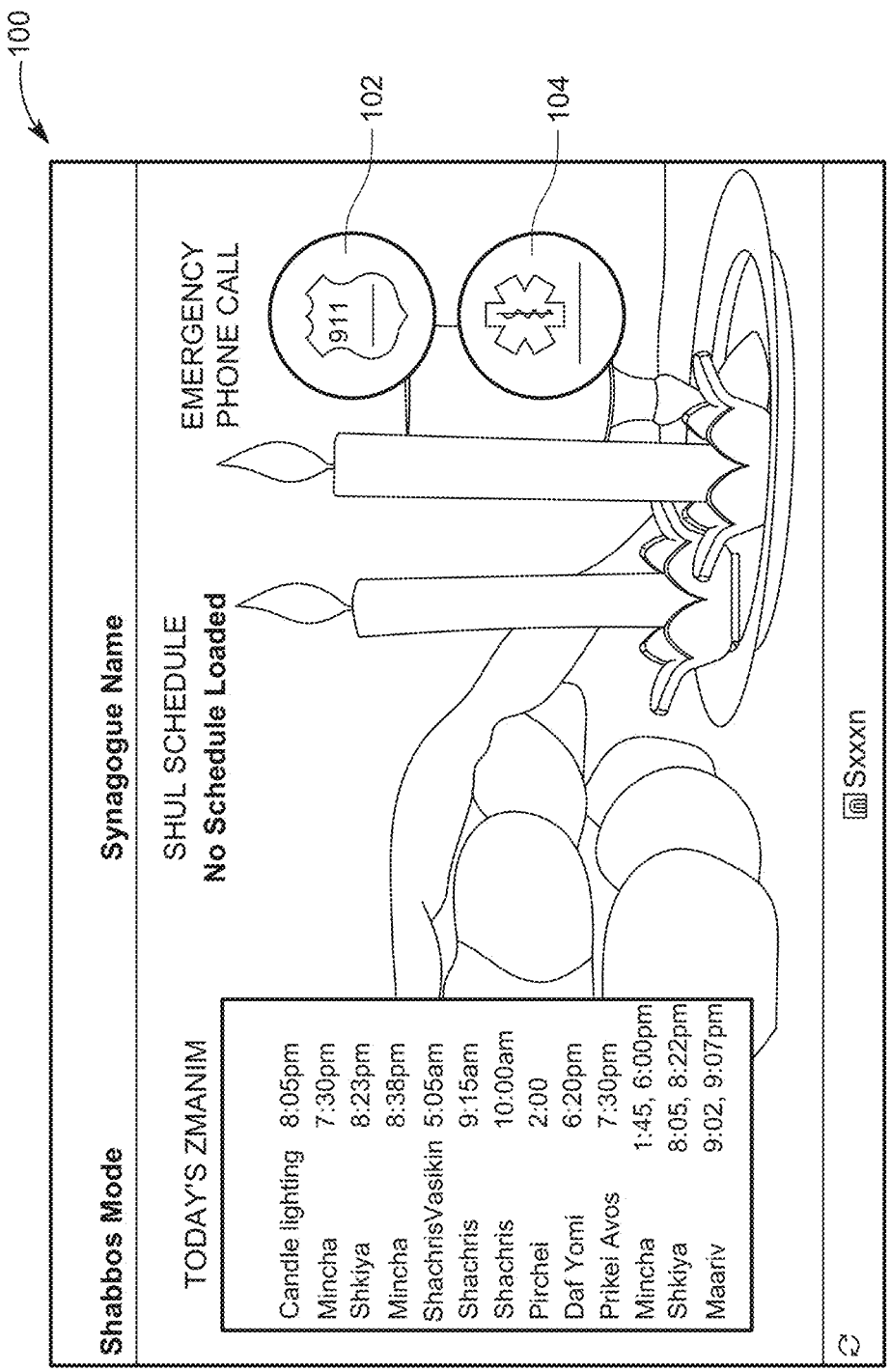
FIG. 1B illustrates a view of home screen of a user interface of the kiosk while in a particular mode, in accordance with the disclosed technology.

FIG. 1B illustrates a view of a user interface of the kiosk 100 while the kiosk 100 is in a particular mode (e.g., the "emergency mode", "Shabbos Mode" or "Yom Tov Mode"), in accordance with the disclosed technology. As shown, the kiosk 100 includes a user interface that displays a specific home screen when in the particular mode, such as Shabbos Mode or Yom Tov Mode, in which only certain options are viewable during a particular time. While in the Shabbos Mode or Yom Tov Mode, the kiosk 100 will display a user interface through which a patron can contact emergency personnel. This can be particularly helpful for times when patrols are discouraged or prevented from bringing their mobile devices into the space. The user interface of the kiosk 100, for example and not limitation, can show various details of the schedule of services for the day, features for enabling patrons to submit donations, a button 102 for contacting police, and/or a button for contacting hatzolah 104 (e.g., a button for contacting other emergency personnel such as medical personnel, fire personnel, security personnel, religious-specific or otherwise). The buttons 102, 104 can be programmable for contacting whichever emergency personnel are desired. Further, the buttons 102, 104 can be a physical button on the kiosk 100 pushed by a patron or the buttons 102, 104 can be programmed such that when a patron touches a specific location on a touch screen, the button 102, 104 can be activated.

Relating to the particular mode, it should be noted that in any of the embodiments herein, certain functionalities of the kiosk can be modified by an owner of the kiosk in order to facilitate compliance with religious practice. For example, if religious practice allows the passive viewing of a schedule, then a schedule can be available on the user interface when the kiosk is in the particular mode. Conversely, if religious practice disallows the passive viewing of a schedule, then a schedule can be hidden from the user interface when the kiosk is in the particular mode. Similarly, if religious practice allows for technology-facilitated donations on days when technology is otherwise prohibited, then an option to donate can be available on the user interface when the kiosk is in the particular mode. And conversely, if religious practice disallows technology-facilitated donations on days when technology is prohibited, then an option to donate can be hidden from the user interface when the kiosk is in the particular mode.

Figure 2:
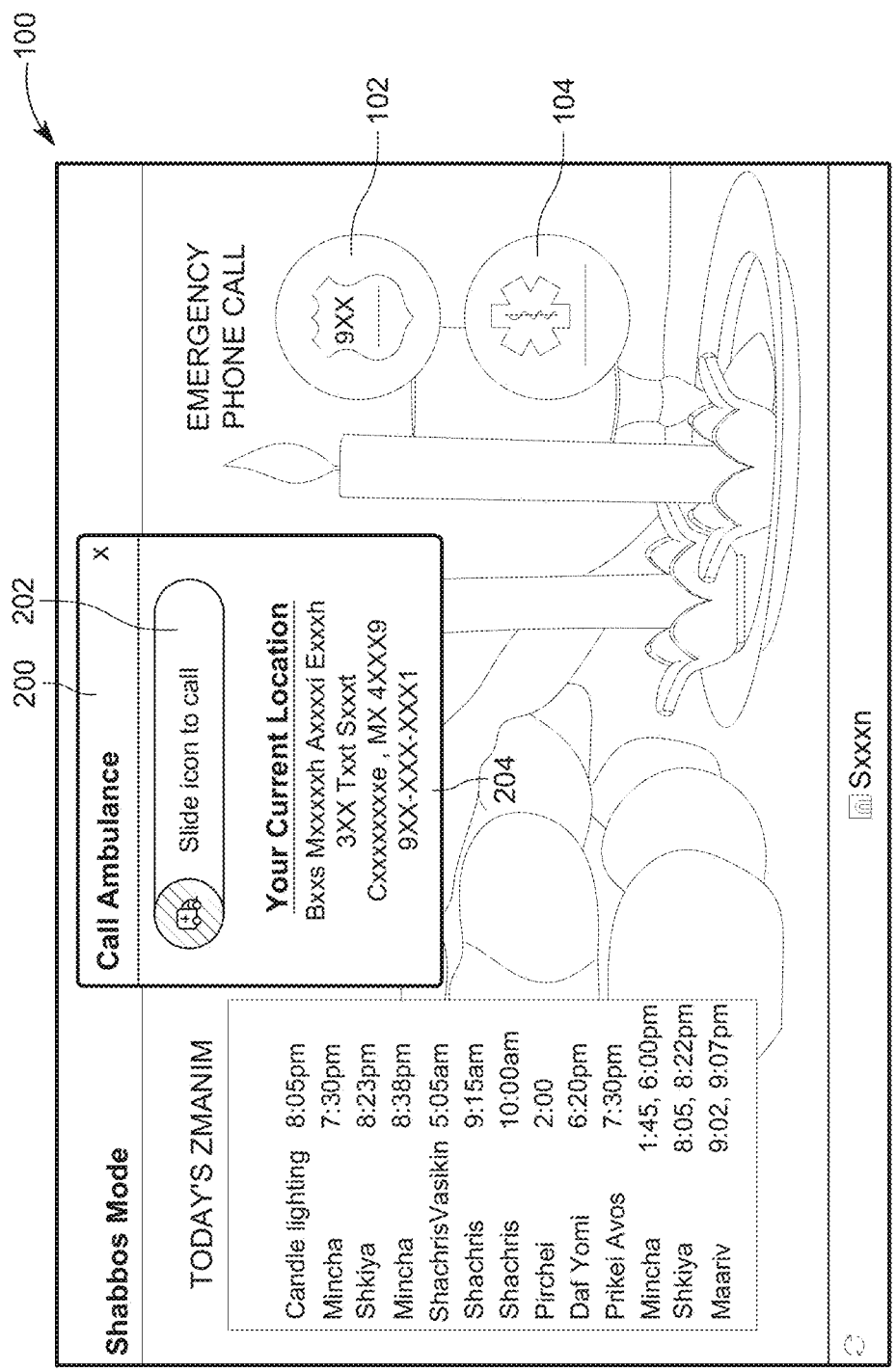
FIG. 2 illustrates a view of screen for initiating emergency calls using a user interface of the kiosk, in accordance with the disclosed technology.

FIG. 2 illustrates a view of a screen for initiating emergency calls using a user interface of the kiosk 100, in accordance with the disclosed technology. As shown in FIG. 2, once a patron pushes a button 102, 104, the kiosk 100 will display a different window 200 on the user interface to enable a patron to conduct an emergency call. For example, as shown in FIG. 2, the kiosk 100 will display a window 200 to enable a patron to call an ambulance. To help prevent a user from accidentally calling emergency personnel, the window 200 can include a slide to call 202 button that a user must slide in order to call emergency personnel. This can be helpful for preventing children or other patrons from accidentally calling emergency personnel.

The window 200 can also display location information 204 so that a patron using the kiosk 100 can know what location information to give the emergency personnel so that help can respond quickly to the emergency. Additionally, the disclosed technology can also include programming and/or features that can automatically inform emergency personnel which location is in need of emergency help. For example, the kiosk 100 information (IP address, phone number, etc.) can be pre-registered with emergency services so that emergency personnel can know to elevate the importance of the call and already know which location is in need of emergency services (e.g., the location of the kiosk 100 can be pre-registered so that emergency personnel can automatically be made aware of the location in need of emergency services).

Figure 3:
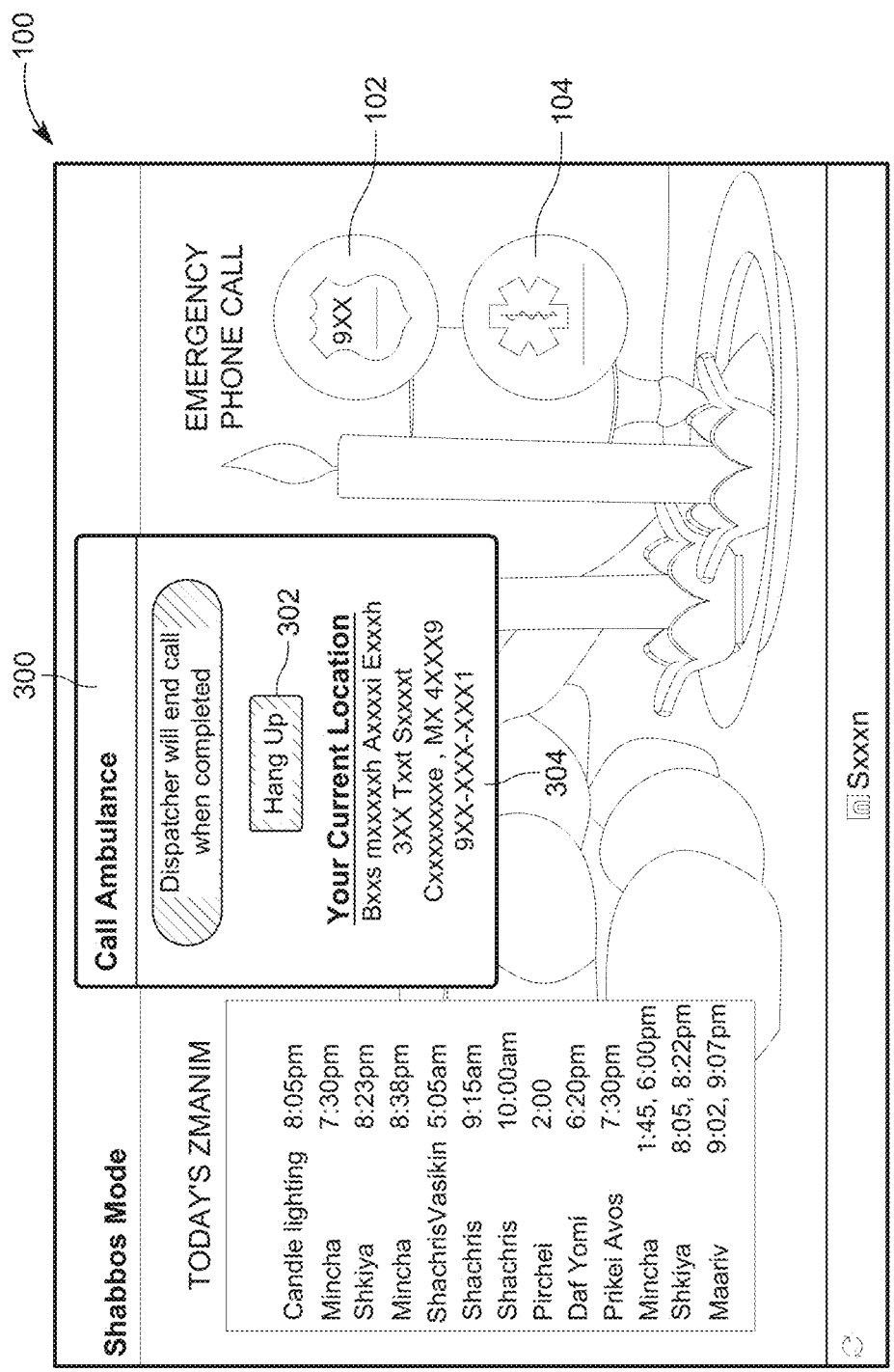
FIG. 3 illustrates a view of screen displayed while conducting emergency calls using a user interface of the kiosk, in accordance with the disclosed technology.

FIG. 3 illustrates a view of a screen displayed while conducting emergency calls using a user interface of the kiosk 100, in accordance with the disclosed technology. As shown, the kiosk 100 can be much more than a simple panic button that sends an emergency signal. Rather, the kiosk 100 can enable two-way calling to allow a patron to communicate directly with emergency personnel or a dispatch service. This can enable emergency personnel to be better prepared to respond to the emergency because a patrol can speak with the emergency personnel and explain the situation. The kiosk 100, for example, can include a speaker, microphone, and/or camera to enable two-way communication with emergency personnel or a dispatch service. Additionally, the kiosk 100 can be configured to allow emergency personnel to call back to the kiosk 100 so that the emergency personnel can contact the patron at the kiosk 100 should a call become disconnected. Furthermore, as shown in FIG. 3, the kiosk 100 will automatically end the call when the emergency personnel terminate the connection, thereby preventing prolonged or unintended calls.

Figure 4A:
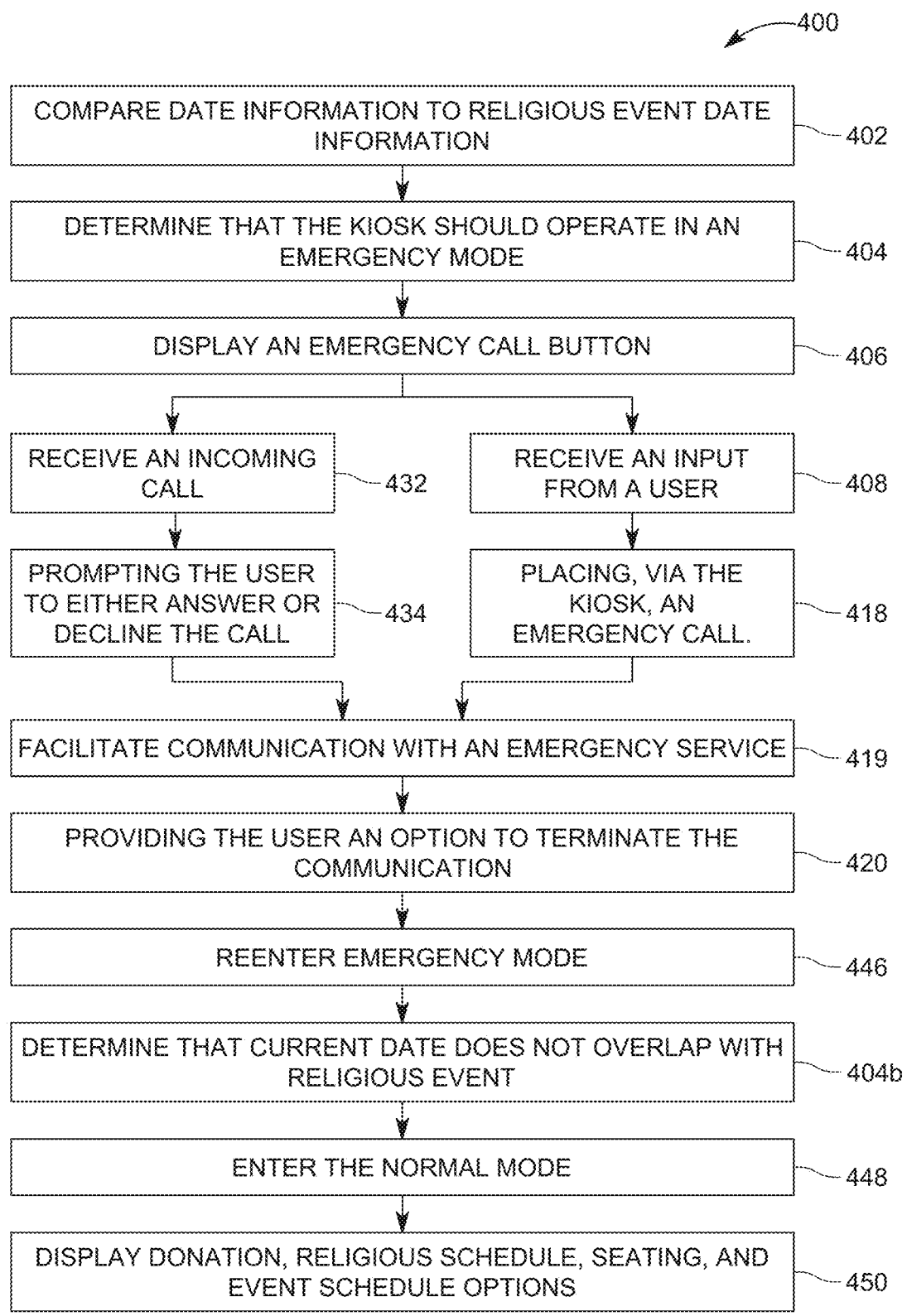
FIGS. 4A, 4B, 4C, and 4D illustrate a method of conducting emergency calls using the kiosk, in accordance with the disclosed technology.

FIG. 4A illustrates an overview for a method 400 for conducting an emergency call using a payment kiosk. Method 400 can be carried out, for example, using kiosk 100. The method 400 can include determining that the payment kiosk should operate in an emergency mode by comparing 402 at pre-determined intervals, date information to a schedule of religious events on which use of certain technology is prohibited. The schedule of religious events can be programmed into the kiosk by a user or downloaded from a central database, for example via the internet. The intervals can be, by way of example, daily. In other examples, the intervals can be hourly, weekly, or monthly.

Upon determining 404 that a current date overlaps with a religious event on which use of certain technology is prohibited, the kiosk enters the emergency mode (such as that shown in FIG. 1B) and displays an emergency call option (as shown in FIG. 2). In some examples, the kiosk displays more than one emergency call option. One of the emergency call options can correspond to a nonreligious-based emergency services provider, and another call option can correspond to a religious-based emergency services provider. In response to receiving 408 an input from a user, such as the emergency call option being selected (e.g. sliding the slide button) and placing 418 an emergency call, or alternatively receiving 432 an incoming call and prompting 434 the user to answer the call, the kiosk facilitates 419 communication with an emergency service via a microphone and a speaker on the kiosk. Following the user placing 418 or answering 434 the call, the kiosk can provide 420 the user an option to terminate the call. In some examples, the kiosk provides the location or address of the kiosk so that the user can relay it to the emergency services provider. Then, following the user terminating 420 the call, the kiosk can re-enter 446 the emergency mode.

As the kiosk continues to operate, at a subsequent interval, when the kiosk determines 404b that a current date does not overlap with a religious event on which use of certain technology is prohibited, the kiosk will enter 448 the normal mode. In the normal mode, the kiosk returns to functioning as a payment kiosk that displays 450 various options to facilitate religious practice, for example, an option for making a donation, an option for viewing a religious schedule, an option for viewing seating availability, and an option for viewing a schedule of events.

Figure 4B:
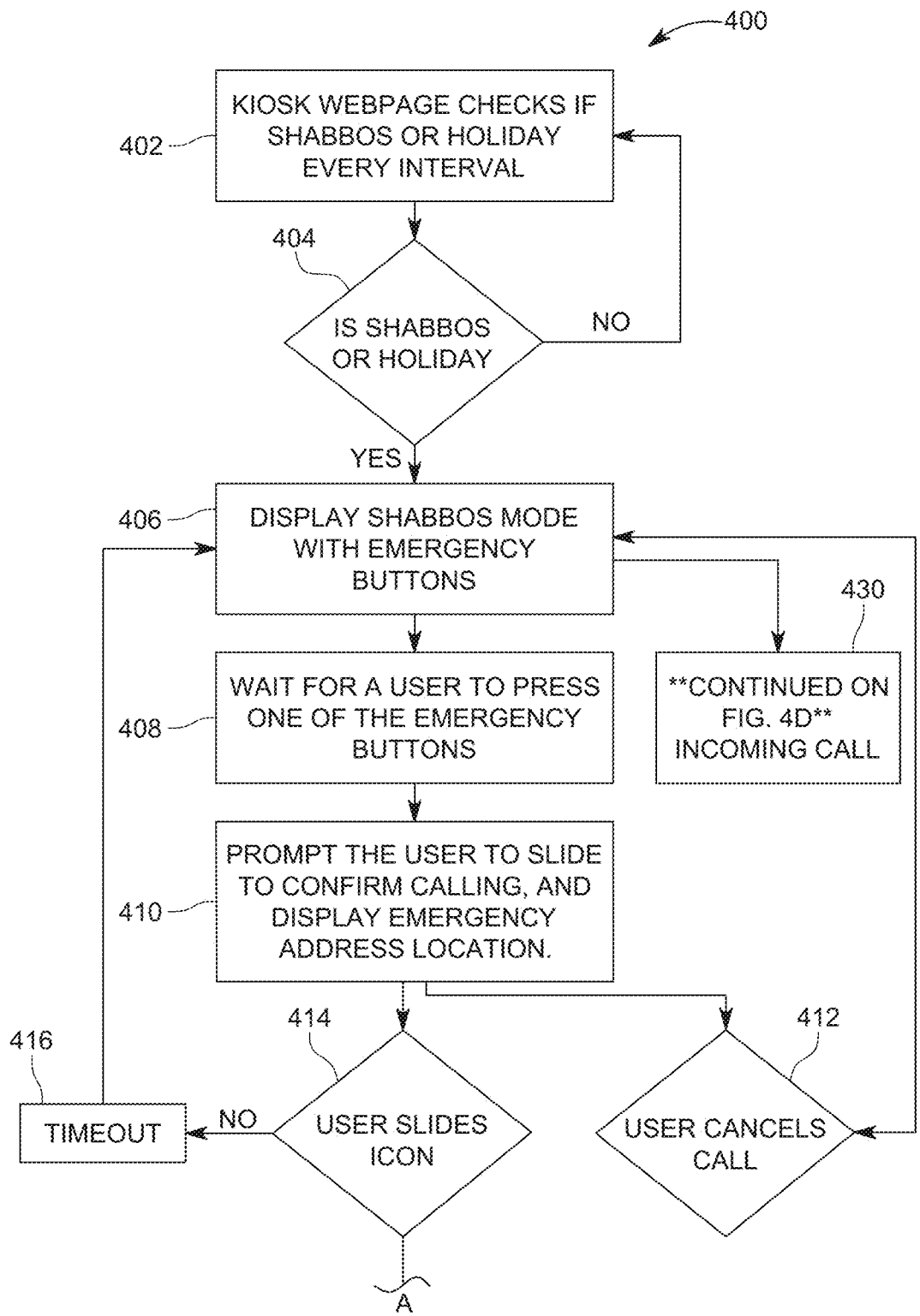
Figure 4C:
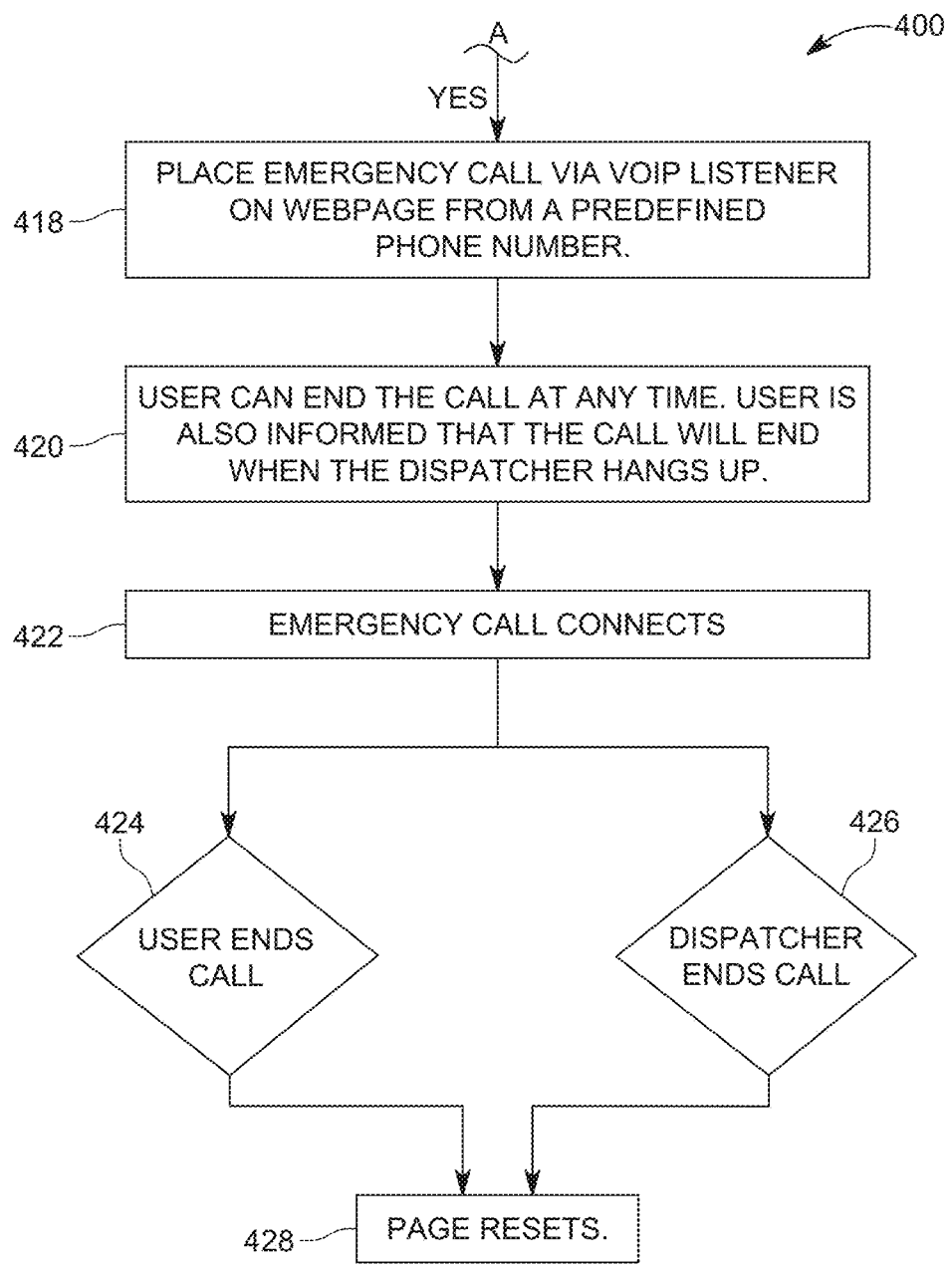
Figure 4D:
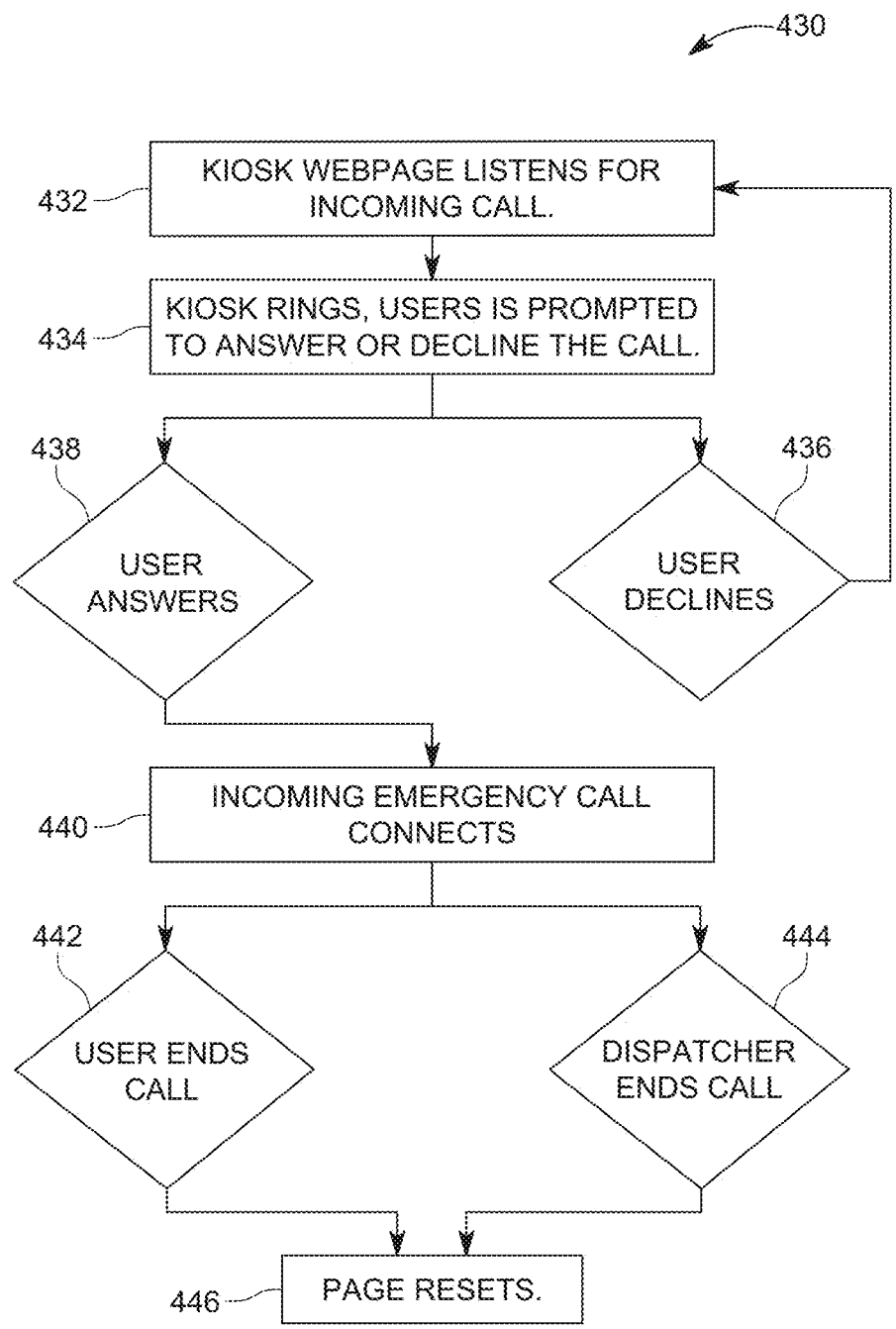

FIGS. 4B, 4C, and 4D illustrate in more detail specific embodiments of method 400 of conducting emergency calls using the kiosk, in accordance with the disclosed technology. As shown, the method 400 can include the kiosk 100 checking 402 (e.g., by comparing date information to dates of religious events on which use of certain technology is prohibited) if it should be in a particular mode configured to display the emergency call features (e.g., Shabbos, holiday, or other time where emergency call features are desired). When the kiosk 100 determines 404 that it should enter a mode wherein the emergency call features are displayed (e.g., Shabbos mode), the method 400 can display 406 the emergency buttons 102, 104.

The method 400 can then wait to receive 408 an input from a user (e.g., wait for a user to press one of the emergency buttons 102, 104). Once the user presses one of the emergency buttons 102, 104, the method 400 can include prompting 410 the user to slide 414 the slide button 202 to confirm calling and display emergency address information. If the user cancels the call 412, the method 400 can cancel the call 412 and once again display 406 the emergency buttons. If the user does not slide the slide button 202 after a given amount of time, the method 400 can similarly cancel the call 412 and once again display 406 the emergency buttons. The slide button 202 functions to reduce a user accidentally making a call, for example by pressing the wrong button, bumping into the kiosk 100, or allowing a child to tap on the kiosk 100. As opposed to simply pressing a button, the slide button 202 requires a more complex action (touching and sliding in a specified direction) in order to place a call. Alternative means for accomplishing the same function can be employed and are contemplated herein, to include press-and-hold buttons, which also function to prevent accidental calls.

As continued on FIG. 4C, if the user slides the slide button 202, the method 400 can include placing 418 an emergency call to contact emergency personnel. For example, the method 400 can include placing 418 a call via a Voice over Internet Protocol (VoIP) listener on a webpage from a predefined phone number. The method 400 can include information a user that the user can end 420 the call at any time. The user can also be informed that the call will end when the dispatcher hangs up.

The method can include connecting 422 the user of the kiosk 100 to emergency personnel but completing the call. The user can end the call 424 by pressing button to end the call and/or the emergency personnel can end the call 426, either of which will cause the method 400 to reset 428 the page and once again display the emergency buttons 102, 104 for subsequent calls.

In some examples, as shown further in FIG. 4D, the method 400 can include the kiosk 100 receiving 432 an incoming call (e.g., from emergency personnel). If the kiosk 100 receives a call, the kiosk 100 can ring 434 and a user can be prompted to answer or decline the call. If the user declines the call 436, the method can include returning again to wait to receive an incoming call.

If the user answers the call 438 the method 400 can include connecting 440 the kiosk with the inbound caller (e.g., emergency personnel) to allow a user of the kiosk 100 to speak with emergency personnel. The user can end the call 442 by pressing button to end the call and/or the emergency personnel can end the call 444, either of which will cause the method 400 to reset 446 the page and once again display the emergency buttons 102, 104 for subsequent calls.

As will be appreciated, the foregoing method 400 is offered for illustrative purposes and the method 400 can include intervening steps or the steps can be arranged in other orders without departing from the scope of this disclosure. Accordingly, the disclosed technology should not be construed as limited to the particular steps or order of steps just described.

Figure 5:
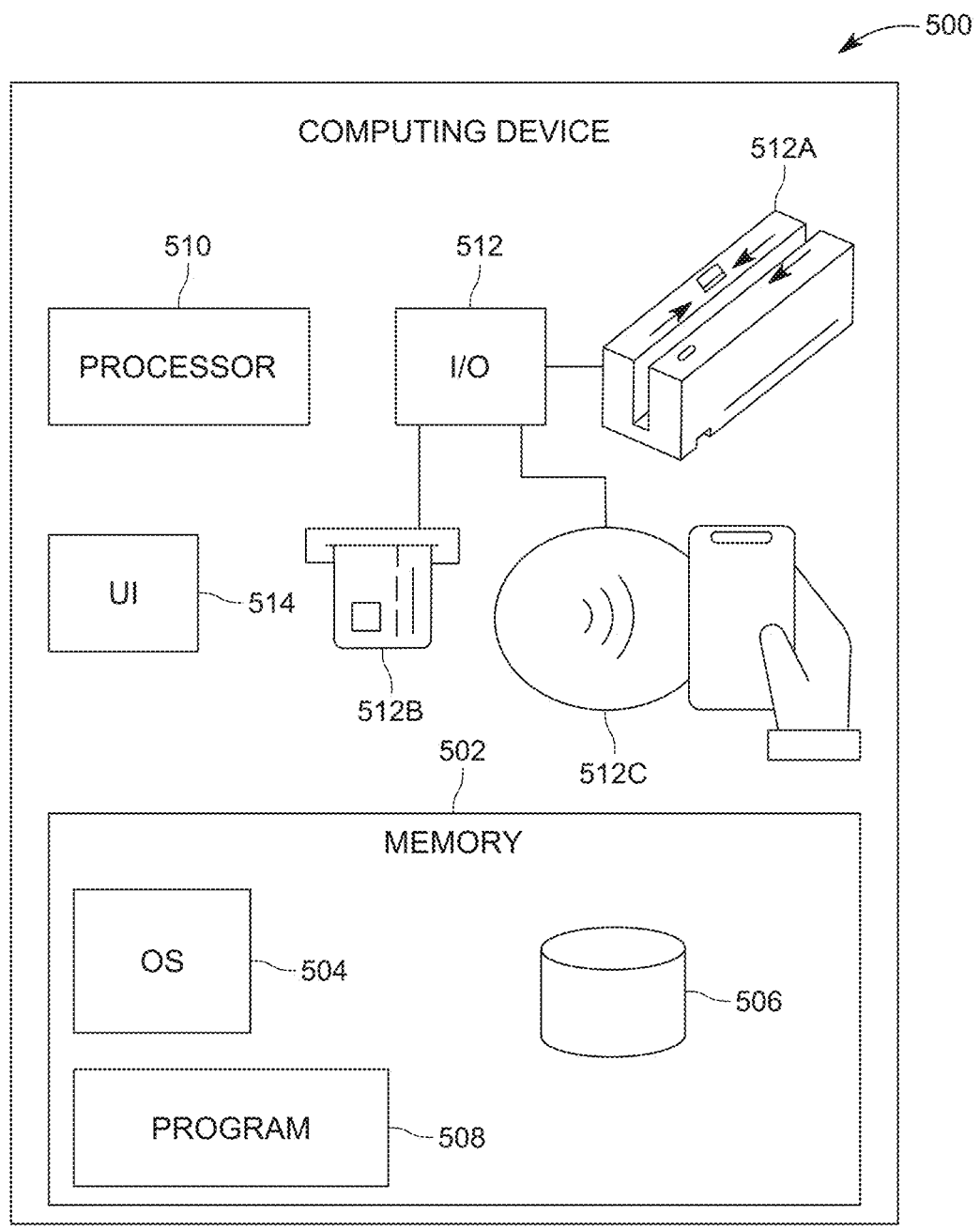
FIG. 5 illustrates an example computing device configured conduct emergency calls and receive and manage donations, in accordance with an example of the disclosed technology.

FIG. 5 illustrates an example computing device configured to conduct emergency calls, in accordance with an example of the disclosed technology. As will be appreciated by one of skill in the art, the computing device 500 can be configured to include all or some of the features described in relation to the kiosk 100. As shown, the computing device 500 may include a processor 510, an input/output ("I/O") device 512, a memory 502 containing an operating system ("OS") 504 and a program 508. In certain example implementations, the computing device 500 may be a single server or may be configured as a distributed computer system including multiple servers or computers that interoperate to perform one or more of the processes and functionalities associated with the disclosed embodiments. In some embodiments, computing device 500 may be one or more servers from a serverless or scaling server system. In some embodiments, the computing device 500 may further include a peripheral interface, a transceiver, a mobile network interface in communication with the processor 510, a bus configured to facilitate communication between the various components of the computing device 500, and a power source configured to power one or more components of the computing device 500.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 510 to communicate with other devices via wired or wireless networks, whether local or wide area, private or public, as known in the art. A power source may be configured to provide an appropriate alternating current (AC) or direct current (DC) to power components.

The processor 510 may include one or more of a microprocessor, microcontroller, digital signal processor, co-processor or the like or combinations thereof capable of executing stored instructions and operating upon stored data. The memory 502 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 502.

The processor 510 may be one or more known processing devices, such as, but not limited to, a microprocessor from the Pentium™ family manufactured by Intel™ or the Turion™ family manufactured by AMD™. The processor 510 may constitute a single core or multiple core processor that executes parallel processes simultaneously. For example, the processor 510 may be a single core processor that is configured with virtual processing technologies. In certain embodiments, the processor 510 may use logical processors to simultaneously execute and control multiple processes. The processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the computing device 500 may include one or more storage devices configured to store information used by the processor 510 (or other components) to perform certain functions related to the disclosed embodiments. In one example, the computing device 500 may include the memory 502 that includes instructions to enable the processor 510 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the computing device 500 may include a memory 502 that includes instructions that, when executed by the processor 510, perform one or more processes consistent with the functionalities disclosed herein. Methods, systems, and articles of manufacture consistent with disclosed embodiments are not limited to separate programs or computers configured to perform dedicated tasks. For example, the computing device 500 may include the memory 502 that may include one or more programs 508 to perform one or more functions of the disclosed embodiments.

The processor 510 may execute one or more programs located remotely from the computing device 500. For example, the computing device 500 may access one or more remote programs that, when executed, perform functions related to disclosed embodiments.

The memory 502 may include one or more memory devices that store data and instructions used to perform one or more features of the disclosed embodiments. The memory 502 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 502 may include software components that, when executed by the processor 510, perform one or more processes consistent with the disclosed embodiments. In some examples, the memory 502 may include a database 506 configured to store various data described herein.

The computing device 500 may also be communicatively connected to one or more memory devices (e.g., databases) locally or through a network. The remote memory devices may be configured to store information and may be accessed and/or managed by the computing device 500. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The computing device 500 may also include one or more I/O devices 512 that may comprise one or more user interfaces 514 (e.g., user interface 102) for receiving signals or input from devices and providing signals or output to one or more devices that allow data to be received and/or transmitted by the computing device 500. For example, the computing device 500 may include interface components, which may provide interfaces to one or more input devices, such as one or more keyboards, mouse devices, touch screens, track pads, trackballs, scroll wheels, digital cameras, microphones, sensors, and the like, that enable the computing device 500 to receive data from a user.

Additionally, the computing device 500 can include I/O devices 512 specific to receiving donation information (or payment information) such as a magnetic stripe card reader 512A, a Europay, Mastercard, and Visa (EMV) chip card reader 512B, a near-field communication (NFC) contactless card reader 512C, or other suitable types of card or other monetary payment readers. The NFC contactless card reader can accept donation information from mobile-phone-based payment sources such as Apple Pay, Samsung Pay, and Android Pay. The process for accepting donations via the payment kiosk and transaction processing using the payment kiosk essentially as a point-of-sale system is similar to that understood by those skilled in the pertinent art. For example, first, the user (the one who is donating money) can enter an amount that he or she desires to donate. In terms of a point-of-sale, this entry represents a sale and corresponding sale amount. Next, the user presents a method of payment, for example, a credit card, a debit card, or a mobile phone wallet, to the payment reader. The payment reader receives the donation information. An authorization request is then sent to the acquiring bank, which then sends it to the issuing bank for authorization. The issuing bank can verify funds and perform anti-fraud measures. At the settlement stage, several donations can be batched and sent to the acquiring bank to process deposits to the kiosk owner's account. The donation kiosk can in some examples integrate with merchant service providers including banks, independent sales organizations, and companies such as Square or National Cash Register.

In example embodiments of the disclosed technology, the computing device 500 may include any number of hardware and/or software applications that are executed to facilitate any of the operations. The one or more I/O devices 512 may be utilized to receive or collect data and/or user instructions from a wide variety of input devices. Received data may be processed by one or more computer processors as desired in various implementations of the disclosed technology and/or stored in one or more memory devices.

While the computing device 500 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the computing device 500 may include a greater or lesser number of components than those illustrated.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A donation kiosk comprising:
   a microphone;
   a speaker;
   an input device configured to receive donation information;
   a user interface;
   one or more processors; and
   a memory storing instructions that, when executed by the one or more processors, are configured to cause the donation kiosk to:
      determine whether to operate in an emergency mode, wherein determining whether to operate in the emergency mode comprises:
         comparing, at pre-determined intervals, time information to a schedule of religious events during which use of certain technology is prohibited; and
         determining that a current time overlaps with a religious event during which use of certain technology is prohibited;
      in response to determining that the donation kiosk should operate in the emergency mode, display an emergency call option on the user interface; and
      in response to the emergency call option being selected, facilitate communication with an emergency service via the microphone and speaker.

2. The donation kiosk of claim 1, wherein the input device comprises a touchscreen, and
   wherein the emergency call option comprises:
      a slide button; and
      upon sliding of the slide button, an option to terminate the emergency call.

3. The donation kiosk of claim 2, wherein, upon the donation kiosk receiving an incoming call, the user interface displays an option to accept the incoming call.

4. The donation kiosk of claim 1, wherein the user interface further displays one or more of:
   an option for making a donation,
   an option for viewing a religious schedule,
   an option for viewing seating availability, and
   an option for viewing a schedule of events.

5. The donation kiosk of claim 1, wherein the input device further comprises, for receiving the donation information, one or more of a magnetic stripe reader, a chip card reader, and a near-field communication (NFC) card reader.

6. The donation kiosk of claim 1, further comprising a unique web-based voice-over-internet-protocol telephone number,
wherein the emergency call option comprises a nonreligious emergency services provider option and a religious emergency services provider option, each of the nonreligious emergency services provider and the religious emergency services provider having been notified that a location of the donation kiosk corresponds to the unique web-based voice-over-internet-protocol telephone number.

7. The donation kiosk of claim 1, wherein the input device comprises a touchscreen, and
wherein the emergency call option comprises:
a press-and-hold button; and
upon holding of the press-and-hold button, an option to terminate the emergency call.

8. The donation kiosk of claim 7, wherein the user interface further displays one or more of:
an option for making a donation,
an option for viewing a religious schedule,
an option for viewing seating availability, and
an option for viewing a schedule of events.

9. The donation kiosk of claim 8, wherein the input device further comprises, for receiving the donation information, one or more of a magnetic stripe reader, a chip card reader, and a near-field communication (NFC) card reader.

10. The donation kiosk of claim 9, further comprising a unique web-based voice-over-internet-protocol telephone number,
wherein the emergency call option comprises a nonreligious emergency services provider option and a religious emergency services provider option, each of the nonreligious emergency services provider and the religious emergency services provider having been notified that a location of the donation kiosk corresponds to the unique web-based voice-over-internet-protocol telephone number.

11. The donation kiosk of claim 1, wherein, upon the donation kiosk receiving an incoming call, the donation kiosk displays an option to accept the incoming call.

12. The donation kiosk of claim 11, wherein the user interface further displays one or more of:
an option for making a donation,
an option for viewing a religious schedule,
an option for viewing seating availability, and
an option for viewing a schedule of events.

13. The donation kiosk of claim 12, wherein the input device further comprises, for receiving the donation information, one or more of a magnetic stripe reader, a chip card reader, and a near-field communication (NFC) card reader.

14. The donation kiosk of claim 13, further comprising a unique web-based voice-over-internet-protocol telephone number,
wherein the emergency call option comprises a nonreligious emergency services provider option and a religious emergency services provider option, each of the nonreligious emergency services provider and the religious emergency services provider having been notified that a location of the donation kiosk corresponds to the unique web-based voice-over-internet-protocol telephone number.

15. A method of conducting an emergency call using a donation kiosk, the method comprising:
determining that the donation kiosk should operate in an emergency mode, wherein determining that the donation kiosk should operate in the emergency mode comprises:
comparing, at pre-determined intervals, time information to a schedule of religious events on which use of certain technology is prohibited; and
determining that a current time overlaps with a religious event on which use of certain technology is prohibited;
in response to determining that the donation kiosk should operate in the emergency mode, displaying an emergency call option; and
in response to the emergency call option being selected, facilitating communication with an emergency service via a microphone and a speaker.

16. The method of claim 15, further comprising:
following a user placing the call, providing the user an option to terminate the call; and
following the user terminating the call, entering the emergency mode.

17. The method of claim 15, further comprising:
upon determining at a subsequent interval, that a current time does not overlap with a religious event on which use of certain technology is prohibited;
entering a normal mode; and
in the normal mode, displaying one or more of:
an option for making a donation,
an option for viewing a religious schedule,
an option for viewing seating availability, and
an option for viewing a schedule of events.

18. An emergency calling system for a donation kiosk comprising:
a microphone;
a speaker;
a user interface;
an input device configured to receive donation information and comprising:
a touch screen; and
one or more of a magnetic stripe reader, a chip card reader, and a near-field communication (NFC) card reader;
one or more processors; and
a memory storing instructions that, when executed by the one or more processors, are configured to cause the donation kiosk to:
display one or more of:
an option for making a donation via the input device,
an option for viewing a religious schedule,
an option for viewing seating availability, and
an option for viewing a schedule of events;
determine whether a current date corresponds to a religious event on which use of certain technology is prohibited;
in response to determining that the current date corresponds to the religious event on which use of certain technology is prohibited, determine that the donation kiosk should operate in an emergency mode and display an emergency call option; and
in response to the emergency call option being selected, facilitate communication with an emergency service via the microphone and speaker.

19. The method of claim 15, further comprising in response to the donation kiosk receiving an incoming call, displaying an option to accept the incoming call.

20. The method of claim 17, further comprising receiving donation information via one or more of a magnetic stripe reader, a chip card reader, and a near-field communication (NFC) card reader.

* * * * *